(12) United States Patent
Boss et al.

(10) Patent No.: US 10,168,684 B2
(45) Date of Patent: *Jan. 1, 2019

(54) POWER PROFILE MANAGEMENT (71) Applicant: International Business Machines Corporation, Armonk, NY (US)

(72) Inventors: Gregory J. Boss, Saginaw, MI (US); Rick A. Hamilton, II, Charlottesville, VA (US); Julianne F. Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 323 days.

This patent is subject to a terminal disclaimer.

(21) Appl. No.: 15/073,803

(22) Filed: Mar. 18, 2016

(65) Prior Publication Data
US 2016/0202686 A1 Jul. 14, 2016

Related U.S. Application Data (63) Continuation of application No. 13/952,089, filed on Jul. 26, 2013, now Pat. No. 9,330,425, which is a
(Continued)

(51) Int. Cl.
*H02J 3/14* (2006.01)
*G06Q 50/06* (2012.01)
(Continued)

(52) U.S. Cl.
CPC ........... *G05B 19/0428* (2013.01); *G01D 4/00* (2013.01); *G06Q 10/00* (2013.01); *G06Q 50/06* (2013.01);
(Continued)

(58) Field of Classification Search
CPC ........ G05B 19/0428; G05B 2219/2639; G06Q 10/00; G06Q 50/06; G01D 4/00;
(Continued)

(56) References Cited

U.S. PATENT DOCUMENTS 6,900,738 B2 5/2005 Crichlow
6,965,319 B1 11/2005 Crichlow
(Continued)

FOREIGN PATENT DOCUMENTS

EP 1441430 7/2004
JP 2004032983 1/2004
JP 2005045899 2/2005

OTHER PUBLICATIONS

Office Action (dated Dec. 14, 2012) for U.S. Appl. No. 12/684,151, filed Jan. 8, 2010; Confirmation No. 4616.
(Continued)

*Primary Examiner* — M. N. Von Buhr
(74) *Attorney, Agent, or Firm* — Schmeiser, Olsen & Watts; Michael A. Petrocelli (57) ABSTRACT

A power profile management method and system. The method includes retrieving by a computer processor input data associated with a user of power consumption devices at a specified location. The computer processor retrieves power consumption data comprising power consumption levels for the power consumption devices. The computer processor generates and transmits a mobile usage portfolio associated said user and the power consumption devices. The computer processor generates a load usage prediction report associated with the user and the power consumption devices. The load usage prediction report is generated based on the mobile usage portfolio and said power consumption data. The computer processor transmits the load usage prediction report to a power provider utility for analysis.

19 Claims, 5 Drawing Sheets

Related U.S. Application Data continuation of application No. 12/684,151, filed on Jan. 8, 2010, now Pat. No. 8,543,247.

(51) Int. Cl.
| | |
|---|---|
| *G05B 19/042* | (2006.01) |
| *G01D 4/00* | (2006.01) |
| *G06Q 10/00* | (2012.01) |
| *H04L 12/00* | (2006.01) |
| *H04L 12/10* | (2006.01) |
| *H02J 3/00* | (2006.01) |

(52) U.S. Cl.
CPC .............. *H04L 12/00* (2013.01); *H04L 12/10* (2013.01); *G05B 2219/2639* (2013.01); *H02J 2003/003* (2013.01); *H02J 2003/143* (2013.01); *Y02B 70/3266* (2013.01); *Y04S 20/242* (2013.01)

(58) Field of Classification Search
CPC .... H04L 12/00; H04L 12/10; H02J 2003/003; H02J 2003/143; Y04S 20/242; Y02B 70/3266
See application file for complete search history.

(56) References Cited

U.S. PATENT DOCUMENTS

| | | |
|---|---|---|
| 7,123,994 B2 | 10/2006 | Weik et al. |
| 7,215,109 B2 | 5/2007 | Angerame et al. |
| 7,420,293 B2 | 9/2008 | Donnelly et al. |
| 7,565,227 B2 | 7/2009 | Richard et al. |
| 7,739,138 B2 | 6/2010 | Chauhan et al. |
| 7,834,806 B2 | 11/2010 | Tucker et al. |
| 8,010,240 B2 | 8/2011 | Mattiocco et al. |
| 8,024,073 B2 | 9/2011 | Imes et al. |
| 8,073,573 B2 | 12/2011 | Chassin et al. |
| 8,095,233 B1 | 1/2012 | Shankar et al. |
| 8,131,403 B2 | 3/2012 | Forbes, Jr. et al. |
| 8,145,361 B2 | 3/2012 | Forbes, Jr. et al. |
| 8,170,886 B2 | 5/2012 | Luff |
| 8,174,381 B2 * | 5/2012 | Imes .................... F24F 11/006 340/539.23 |
| 8,183,712 B2 | 5/2012 | MacLellan et al. |
| 8,219,505 B2 | 7/2012 | Richard et al. |
| 8,239,073 B2 | 8/2012 | Fausak et al. |
| 8,260,468 B2 | 9/2012 | Ippolito et al. |
| 8,290,727 B2 | 10/2012 | Kreiss et al. |
| 8,311,863 B1 | 11/2012 | Kemp |
| 8,315,717 B2 | 11/2012 | Forbes, Jr. et al. |
| 8,543,247 B2 | 9/2013 | Boss et al. |
| 9,330,425 B2 * | 5/2016 | Boss ....................... G01D 4/00 |
| 2003/0005676 A1 | 1/2003 | Martignon |
| 2003/0055677 A1 | 3/2003 | Brown et al. |
| 2003/0158826 A1 | 8/2003 | Burke et al. |
| 2003/0233201 A1 | 12/2003 | Horst et al. |
| 2004/0006439 A1 | 1/2004 | Hunter |
| 2007/0018852 A1 | 1/2007 | Seitz |
| 2008/0177678 A1 | 7/2008 | Di Martini et al. |
| 2008/0238710 A1 | 10/2008 | Tolnar et al. |
| 2009/0187499 A1 | 7/2009 | Mulder et al. |
| 2010/0138363 A1 | 6/2010 | Batterberry et al. |
| 2010/0318238 A1 | 12/2010 | Bryson et al. |
| 2011/0172836 A1 | 7/2011 | Boss et al. |
| 2011/0224838 A1 | 9/2011 | Imes et al. |
| 2011/0231320 A1 | 9/2011 | Irving |
| 2012/0064923 A1 | 3/2012 | Imes et al. |
| 2012/0072033 A1 | 3/2012 | Imes et al. |
| 2012/0296799 A1 | 11/2012 | Playfair et al. |
| 2013/0310996 A1 | 11/2013 | Boss et al. |

OTHER PUBLICATIONS

Amendment filed Mar. 11, 2013 in response to Office Action (dated Dec. 14, 2012) for U.S. Appl. No. 12/684,151, filed Jan. 8, 2010; Confirmation No. 4616.

Notice of Allowance (dated May 23, 2013) for U.S. Appl. No. 12/684,151, filed Jan. 8, 2010; Confirmation No. 4616.

* cited by examiner

POWER PROFILE MANAGEMENT

This application is a continuation application claiming priority to Ser. No. 13/952,089 filed Jul. 26, 2013, now U.S. Pat. No. 9,330,425 issued May 3, 2016, which is a continuation application claiming priority to Ser. No. 12/684,151 filed Jan. 8, 2010 now U.S. Pat. No. 8,543,247 issued Sep. 24, 2013.

FIELD

The present invention relates to a method and associated system for managing a profile associated with power usage from a utility grid.

BACKGROUND

Managing usage data from a power provider for various power consumption devices typically comprises an inaccurate process with little flexibility. Usage of power provided by power providers typically varies depending on conditions. Varying usage of power may cause power providers to modify output.

SUMMARY

The present invention provides a power usage prediction method comprising:

retrieving, by a computer processor of a mobile computing system, first input data associated with a first user of a first plurality of power consumption devices at a first specified location;

retrieving, by said computer processor, first power consumption data comprising a power consumption level for each power consumption device of said first plurality of power consumption devices;

generating, by said computer processor based on said first input data, a first mobile usage portfolio associated said first user and said first plurality of power consumption devices;

transmitting, by said computer processor to said first specified location, said first mobile usage portfolio;

generating, by said computer processor based on said first mobile usage portfolio and said first power consumption data, a first load usage prediction report associated with said first user and said first plurality of power consumption devices; and transmitting, by said computer processor to a power provider utility for analysis, said first load usage prediction report.

The present invention provides a power usage prediction method comprising:

retrieving, by a computer processor of a computing system from a first mobile computing system, first input data associated with a first user of a first plurality of power consumption devices at a first specified location;

retrieving, by said computer processor from a second mobile computing system, second input data associated with a second user of said first plurality of power consumption devices at said first specified location;

retrieving, by said computer processor from said first location, first power consumption data comprising a power consumption level for each power consumption device of said first plurality of power consumption devices;

generating, by said computer processor based on said first input data, a first mobile usage portfolio associated said first user and said first plurality of power consumption devices;

transmitting, by said computer processor to said first specified location and said first mobile computing system, said first mobile usage portfolio;

generating, by said computer processor based on said second input data, a second mobile usage portfolio associated said second user and said first plurality of power consumption devices;

transmitting, by said computer processor to said first specified location and said second mobile computing system, said second mobile usage portfolio;

generating, by said computer processor based on said first mobile usage portfolio, said second mobile usage portfolio, and said first power consumption data, a first load usage prediction report associated with said first user, said second user, and said first plurality of power consumption devices; and transmitting, by said computer processor to a power provider utility for analysis, said first load usage prediction report.

The present invention provides a power usage prediction method comprising:

retrieving, by a computer processor of a computing system from a first mobile computing system, first input data associated with a first user of a first plurality of power consumption devices at a first specified location;

retrieving, by said computer processor from a second mobile computing system, second input data associated with a second user of a second plurality of power consumption devices at second specified location, wherein said second specified location differs from said first specified location;

retrieving, by said computer processor from said first location, first power consumption data comprising a power consumption level for each power consumption device of said first plurality of power consumption devices;

retrieving, by said computer processor from said second location, second power consumption data comprising a power consumption level for each power consumption device of said second plurality of power consumption devices;

generating, by said computer processor based on said first input data, a first mobile usage portfolio associated said first user and said first plurality of power consumption devices;

transmitting, by said computer processor to said first specified location and said first mobile computing system, said first mobile usage portfolio;

generating, by said computer processor based on said second input data, a second mobile usage portfolio associated said second user and said second plurality of power consumption devices;

transmitting, by said computer processor to said second specified location and said second mobile computing system, said second mobile usage portfolio;

generating, by said computer processor based on said first mobile usage portfolio, said second mobile usage portfolio, said first power consumption data, and said second power consumption data, a first load usage prediction report associated with said first user, said second user, said first plurality of power consumption devices, and said second plurality of power consumption devices; and transmitting, by said computer processor to a power provider utility for analysis, said first load usage prediction report.

The present invention advantageously provides a simple method and associated system capable of managing usage data from a power provider for various power consumption devices.

DETAILED DESCRIPTION

Figure 1:
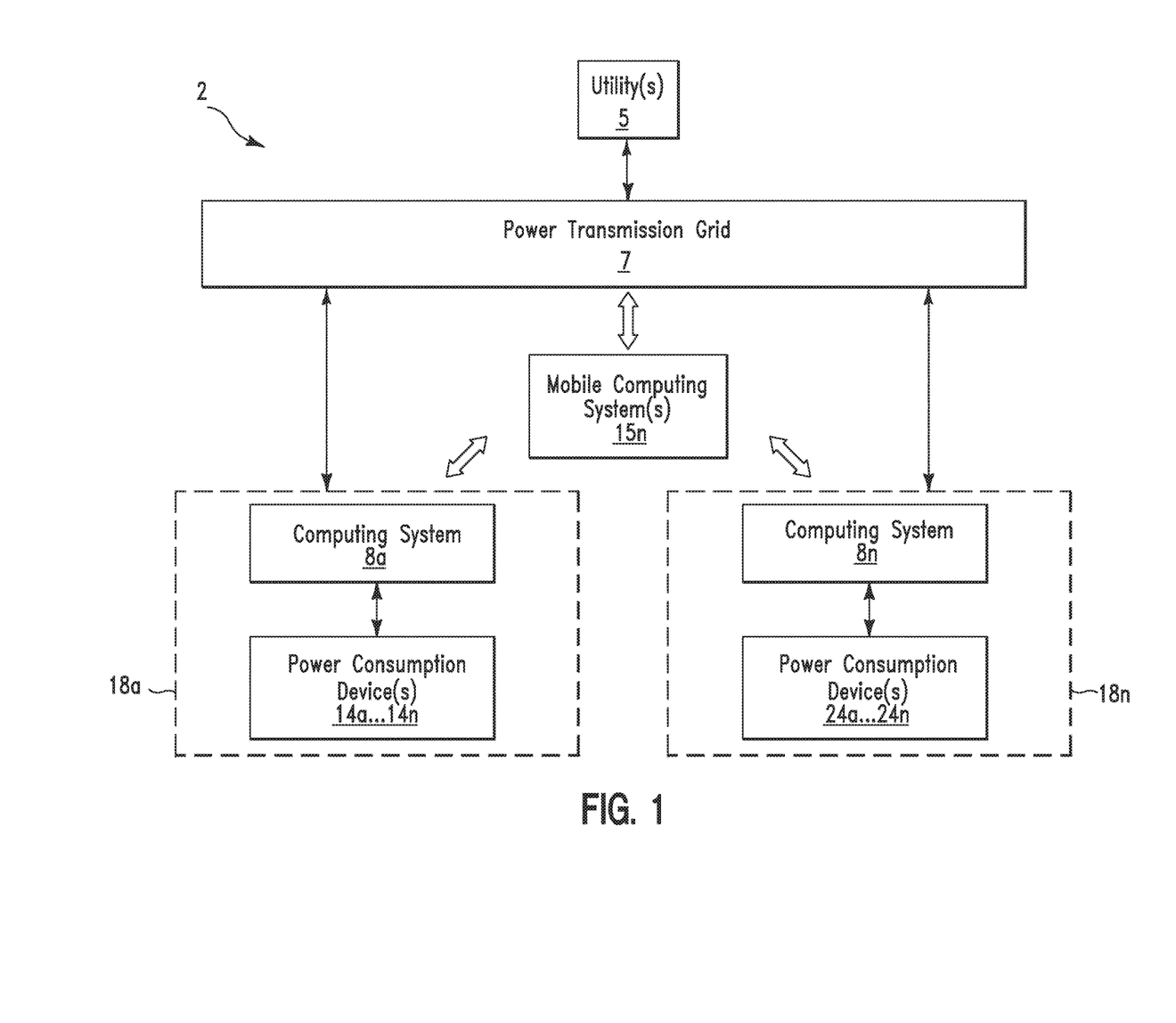
FIG. 1 illustrates a system for predicting an amount of power usage associated with a power transmission grid, in accordance with embodiments of the present invention.

FIG. 1 illustrates a system 2 for predicting an amount of power usage associated with a power transmission grid 7, in accordance with embodiments of the present invention. System 2 comprises an intelligent system for gathering usage profiles associated with one or more users of one or more power consumption devices (e.g., power consumption devices $14n$ ... $14n$, $24a$ ... $24n$, etc) in a residence or business. Power usage by power consumption devices may cause a frequency signal (e.g., 60 Hertz (Hz)) associated with a supply voltage retrieved from a power grid (e.g., power transmission grid 7) to fluctuate (e.g., rise or fall). When the frequency signal drops (i.e., indicating that a load exceeds a supply on power transmission grid 7), a load should be reduced quickly. Therefore, system 2 is enabled to predict future power consumption by power consumption devices so that utility(s) may adjust power generation accordingly. System 2 determines a future load profile for each power consumption device and periodically transmits the associated information to utility(s) 5 to augment a power transmission grid wide load profile. A load profile device (e.g., mobile computing system(s) $15n$), computing system $8a$, computing system $8n$, etc) may be implemented as a software product or a hardware/software device. The load profile device is responsible for retrieving external location, transactional, and event data. Additionally, the load profile device transmits updates (i.e., to a local profile) to utility(s) 5. For example, an air conditioner/furnace thermostat (i.e., monitoring a cooling/heating schedule and determining a future time at which the air conditioner will be turned on/off) may be modified to receive calendar information associated with a users schedule to determine if the users residence will be occupied during a fractional portion of a specified day or an entire day. Additionally, the air conditioner/furnace thermostat may receive inputs from a security system to determine that no motion has been detected or that an armed system has not been deactivated. A load profile device comprises a statistical analysis engine that is coupled with additional events, sensors, and feedback to generate better predictive value. The additional inputs may include: occupancy issues (e.g., whether or not a residence is occupied, a number of workers present, changes in manufacturing shift schedules, etc); an expected time when occupancy changes (e.g., residential calendar inputs such as holidays or vacations, resumption of a manufacturing process, changes in numbers of workers during events such as monthly inventory); feedback from distributed sources of information (e.g., integration of travel data with occupancy calendar information); and fine grained knowledge of specific loads and scheduling (e.g., awareness of individual branch circuit loads such as washers and dryers combined with knowledge of laundry schedules); financial transaction information (e.g., where a credit card was swiped or where a debit transaction or phone micro payment was made); security system sensors including motion detection units and arming status may be used to understand whether deviations in a normal pattern occur in order to augment a prediction algorithm.

System 2 comprises a computing system $8a$ and a computing system $8n$ connected to a utility(s) 5 through a power transmission grid 7. Computing system $8a$, computing system $8n$, and utility(s) are connected to (e.g., via a wireless connection) and communicate with mobile computing system(s) $15n$. Computing system $8a$ is additionally connected to power consumption devices $14a$ ... $14n$. Computing system $8a$ and power consumption devices $14a$ ... $14n$ are located within a specified location $18a$. Specified location $18a$ may comprise a house and surrounding property, a building (associated with a business) and surrounding property, etc. Computing system $8n$ and power consumption devices $24a$ ... $24n$ are located within a specified location $18n$. Specified location $18n$ may comprise a house and surrounding property, a building (associated with a business) and surrounding property, etc. Additional locations (similar to locations $18a$ and $18b$), computing systems (similar to computing systems $8a$ and $8b$), and power consumption devices (similar to power consumption devices $14a$ ... $14n$ and $24a$ ... $24n$) may be comprised by system 2 of FIG. 1. Power consumption devices $14a$ ... $14n$ and $24a$ ... $24n$ may comprise any type of electrical device that consumes electrical power (e.g., appliances, a furnace, an oven, an air conditioner, a computer, a hot water tank, an electric heater, etc) provided by utility(s) 5. Electrical power may be retrieved via a power grid (e.g., power transmission grid 7). Utility 5 may comprise any type of electrical power supplier that produces and/or distributes electrical power. Utilities $5a$ ... $5n$ may produce and/or distribute any type of electrical power including, inter alia, fossil fuel generated power, steam generated power, hydro generated power, solar generated power, wind generated power, fuel cell generated power, etc. Computing system $8a$ and $8n$ may comprise relays or contactors for enabling or disabling power to power consumption devices $14a$ ... $14n$ and $24a$ ... $24n$, respectively. Alternatively, each of power consumption devices $14a$ ... $14n$ and $24a$ ... $24n$ may comprise a relay or contactor that receives a control signal from computing system $8a$, $8n$, or mobile computing system(s) $15n$ and in response enables or disables power to power consumption devices $14a$ ... $14n$. Computing systems $8a$ and $8n$ may comprise any type of computing system including, inter alia, a computer, a laptop/notebook computer, an embedded controller, etc. Mobile computing system(s) $15n$ may comprise one or multiple mobile computing systems. Mobile computing system(s) $15n$ may comprise any type of mobile computing system including, inter alia, a laptop/notebook computer, an embedded controller in an automobile, a digital assistant (PDA), a cellular telephone, etc. Computing systems $8a$, $8n$, and mobile computing system(s) $15n$ may each comprise a memory system. The memory system may comprise a single memory system. Alternatively, the memory system may comprise a plurality of memory systems. The memory system may be internal or external.

Computing systems 8a, 8n, and mobile computing system(s) 15n may each comprise a software application for controlling functionality. Computing systems 8a, 8n, and mobile computing system(s) 15n may communicate with utility(s) using any method including, inter alia, power line communication (PLC), IP-over-power, Internet, wireless, etc. A PLC comprises a system for carrying data on a conductor used for electric power transmission. IP-over-Power comprises a system for using PLC by sending and receiving radio signals over power lines to provide access to the Internet.

Mobile computing system(s) 15n may belong to a single user associated with locations 18a and 18n. Alternatively, mobile computing system(s) 15n may belong to multiple users associated with locations 18a and 18n. Mobile computing system(s) 15n are enabled to generate load profiles for predicting an amount of power usage (i.e., with respect to power consumption devices 14a ... 14n and 24a ... 24n) associated with a power transmission grid 7. Mobile computing system(s) 15n may transmit (e.g., to utility(s) 5) a packet of data that includes an identifier for the a residence or place of business, information about what type of power consumption device is being profiled (e.g., AC system, toaster, freezer, etc), a normal profile is for that day/time, a calculated profile is, a deviation in normal power consumption, and an expected duration of the deviation.

The following steps illustrate a process performed by mobile computing system(s) 15n for predicting an amount of power usage (i.e., with respect to power consumption devices 14a ... 14n and 24a ... 24n) associated with a power transmission grid 7:

1. Retrieve input data associated with a user(s) and power consumption devices 14a ... 14n and 24a ... 24n. The input data may include, inter alia, power consumption data (i.e., an amount of power consumed by) power consumption devices 14a ... 14n and 24a ... 24n, schedule related data associated with user schedules, location based data for the users, etc.
2. Generate mobile usage profiles for the users and/or power consumption devices 14a ... 14n and 24a ... 24n. The mobile usage profile may include data associated with user behavior and power consumption devices 14a ... 14n and 24a ... 24n, linkages between processes between users and power consumption devices 14a ... 14n and 24a ... 24n, etc. Linkages between processes between users and power consumption devices 14a ... 14n and 24a ... 24n may be used to base predictions on people, device, or roles associated with users. Associations between users, devices, and processes may be generated. For example, in a case where process scheduling is used, a calendar that indicates that a specified process will take place (e.g. print yearly reports) may be used to predict a future load on power transmission grid 7.
3. Calculate load predictions for a given time or over a specified time period. Additionally, load predictions and expected variation/deviation from the predictions are determined. In order to calculate load predictions the mobile usage profiles (generated in step 2) may be transmitted to various locations as the users move to various locations. For example, a user gets in his/her automobile and communicates that he/she is leaving home and is going to commute to the office. Using this information, mobile computing system(s) 15n (i.e., in the automobile) notifies the users house that the user is gone and notifies the office to predict how much power the user will consume at the office. Mobile computing system(s) 15n transmits data including an expected arrival time and charge related data indicating if the automobile (i.e., a battery operated automobile) requires a charge, etc. Additionally, mobile computing system(s) 15n calculates an expected load for the user at the office. Mobile computing system(s) 15n predicts that based on schedule data that the user will require less power today because he/she is late going into the office. In order to calculate load predictions, mobile computing system(s) 15n may use historical data (how much power does the user usually use), calendar data (allowing for accounting for load predictions for a process or device that might move from location to location), etc
4. Aggregate power usage predictions for all power consumption devices, users, and locations. The predictions may be communicated through direct communication or masking data for transmitting through a third party. A third party may gather user profiles from different users and locations and provides security for the users by gathering data for multiple users and reporting just a total or by transmitting a usage prediction for a user without identifiable information.
5. A load prediction is transmitted to utilities 5.

The following implementation examples illustrate various embodiments used by system 2 for predicting an amount of power usage associated with power consumption devices and a power transmission grid 7.

Example 1

In this example, Widget Manufacturing (i.e., a company for manufacturing widgets) has 100 workers who work within a central location. On a typical day, 95 workers are present and 5 workers are away on holiday or business. Next Thursday the company is having a going away party for a long time worker and it is determined that 25 workers will be away from the office. Based on this information, it is determined that the power used by Widget Manufacturing will be 20% less than normal. Information regarding the 20% reduction in power may be transmitted to a utility (e.g., utilities 5) providing power.

Example 2

In this example, the Smith family lives in a large, high-tech neighborhood where all of the residences use a community power management system (CPMS) to control heating and air conditioning (HVAC) in order to insure that a uniform load is presented to the power transmission grid by the neighborhood. At a specified date, the Smith's have armed their home alarm and indicated to the CPMS that they are not expected home for 5 days. Using this information, a mobile computing system (e.g., mobile computing system(s) 15n) belonging to the user recalculates the Smith homes load profile based on minimal power usage. Additionally, weather forecasts are consulted to compute thermal loading of the Smith home. The updated load profile is transmitted to the CPMS and the Smith home is given a lower priority for any HVAC needs. As a result, other residents within the neighborhood will see a faster response time to their HVAC needs.

Example 3

In this example, Bill Jones has configured his bank card account to transmit credit card transaction information to his home computer in real time so that he does not have to periodically download transactions. In response, a mobile computing system (e.g., mobile computing system(s) 15n) uses the information to determine if Bill will be returning home from his frequent trips ahead of schedule or not. At 4 pm, a credit card transaction is received from the local airport parking area indicating that Bill is in town and will be home within about 2 hours (i.e., a full day ahead of schedule). In response, mobile computing system recalculates the load profile based on Bill being at home and uploads this information to the CPMS so that his residence may be using power for HVAC loads at a higher priority. Additionally, 2 kilowatt hours of surplus solar power which were going to be sold between 4 pm and sundown at 7 pm are cancelled.

In order to calculate deviations associated load predictions, mobile computing system(s) 15n may use the following methods:
1. Security system methods such as, inter alia, activation of motion sensors, armed/disarmed state of an alarm system, etc.
2. A Vehicle GPS tracking method may be used. For example, if two vehicles are located a greater distance than X miles from a residence or business then a determination may be made that vehicle owner/driver will not be consuming electricity at their residence for X number of hours.
3. A credit card usage method may be used check for purchases made in remote places to determine that a user is at home or away from home. For example, if a credit card was scanned from another city it may be inferred that the user is away and won't be back home for X number of hours.
4. Calendar entries may be used to determine how many people in a residence or business will be going into work or are away from home on any given day. The more people that are absent, the lower the power usage will be.
5. A power usage deviation method may be used. For example, if a room light is not turned on or a sink is not activated in X number of minutes, it may be inferred that the house or business is not in use.
6. An appliance scheduling method may be used. For example, individual major appliances may be scheduled for use at some time in the future. Based on past power consumption, a load at the given point in time is calculated to include those major appliance loads.

Figure 2:
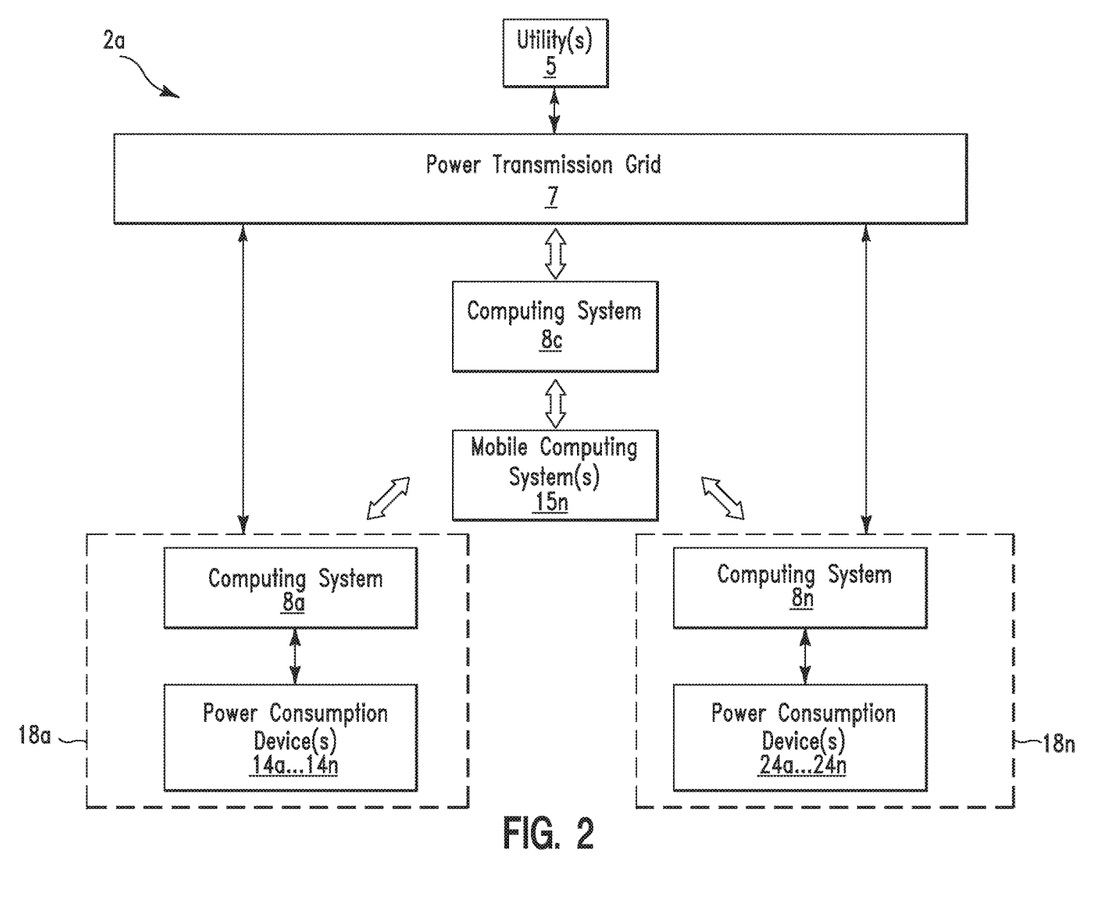
FIG. 2 illustrates an alternative system to the system of FIG. 1, in accordance with embodiments of the present invention.

FIG. 2 illustrates an alternative system 2a to system 2 of FIG. 1, in accordance with embodiments of the present invention. In contrast to system 2 of FIG. 1, system 2a of FIG. 2 comprises an additional computing system 15n for predicting an amount of power usage associated with a power transmission grid 7. Locations 18a and 18b comprise locations as described with respect to location 18 of FIG. 1. Power consumption devices 14a . . . 14n and 24a . . . 24n comprise power consumption devices as described with respect to power consumption devices 14a . . . 14n of FIG. 1. Computing system 8c, computing system 8a and 8b, and mobile computing system(s) 15n each comprise a computing system as described with respect to FIG. 1. Computing system 8c retrieves data from mobile computing systems (i.e., associated with multiple users and locations) and uses the retrieved data for predicting an amount of power usage associated with a power transmission grid 7. Computing system 8c may comprise a third party (i.e., not associated with utility(s), users, or locations 18a and 18n) computing system for providing secure power usage predictions.

Figure 3:
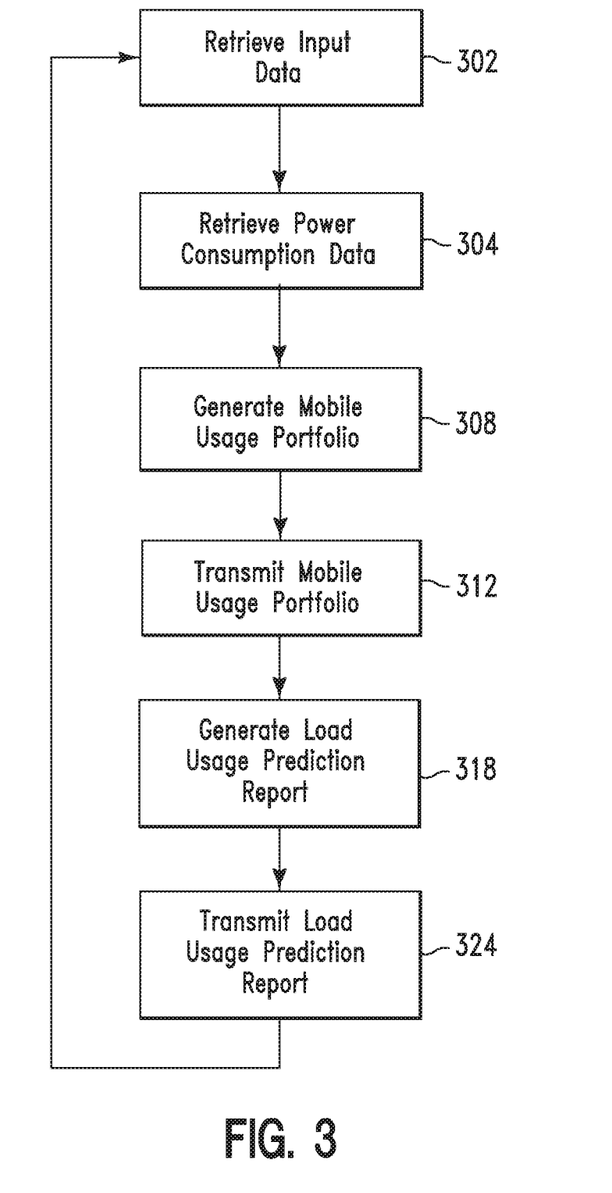
FIG. 3 illustrates a flowchart describing an algorithm used by the system of FIG. 1 for predicting an amount of power usage associated with a power transmission grid, in accordance with embodiments of the present invention.

FIG. 3 illustrates a flowchart describing an algorithm used by system 2 of FIG. 1 for generating load usage prediction reports for a single user, in accordance with embodiments of the present invention. In step 302, a computing system (e.g., a computer processor of mobile computing system(s) 15n of FIG. 1 retrieves input data associated with a user of a power consumption devices (e.g., power consumption devices 14a . . . 14n) at a specified location. In step 304, the computing system retrieves power consumption data comprising a power consumption level for each of the power consumption devices. In step 308, the computing system generates (i.e., based on the input data, a mobile usage portfolio associated the first user and the power consumption devices. In step 312, the computing system transmits (to the specified location) the mobile usage portfolio. In step 318, the computing system generates (i.e., based on the mobile usage portfolio and the power consumption data) a load usage prediction report associated with the user and the power consumption devices. The load usage prediction report may comprise, inter alia, a predicted amount of power usage for the power consumption devices during a future specified time period, an expected amount of variation from the predicted amount of power usage, a current location of the user, a distance between locations, etc. In step 324, the computing system transmits the load usage prediction report to a power provider utility for analysis and the process is repeated for the same user at another location, a generating a modified load usage prediction report using new data, etc.

Figure 4:
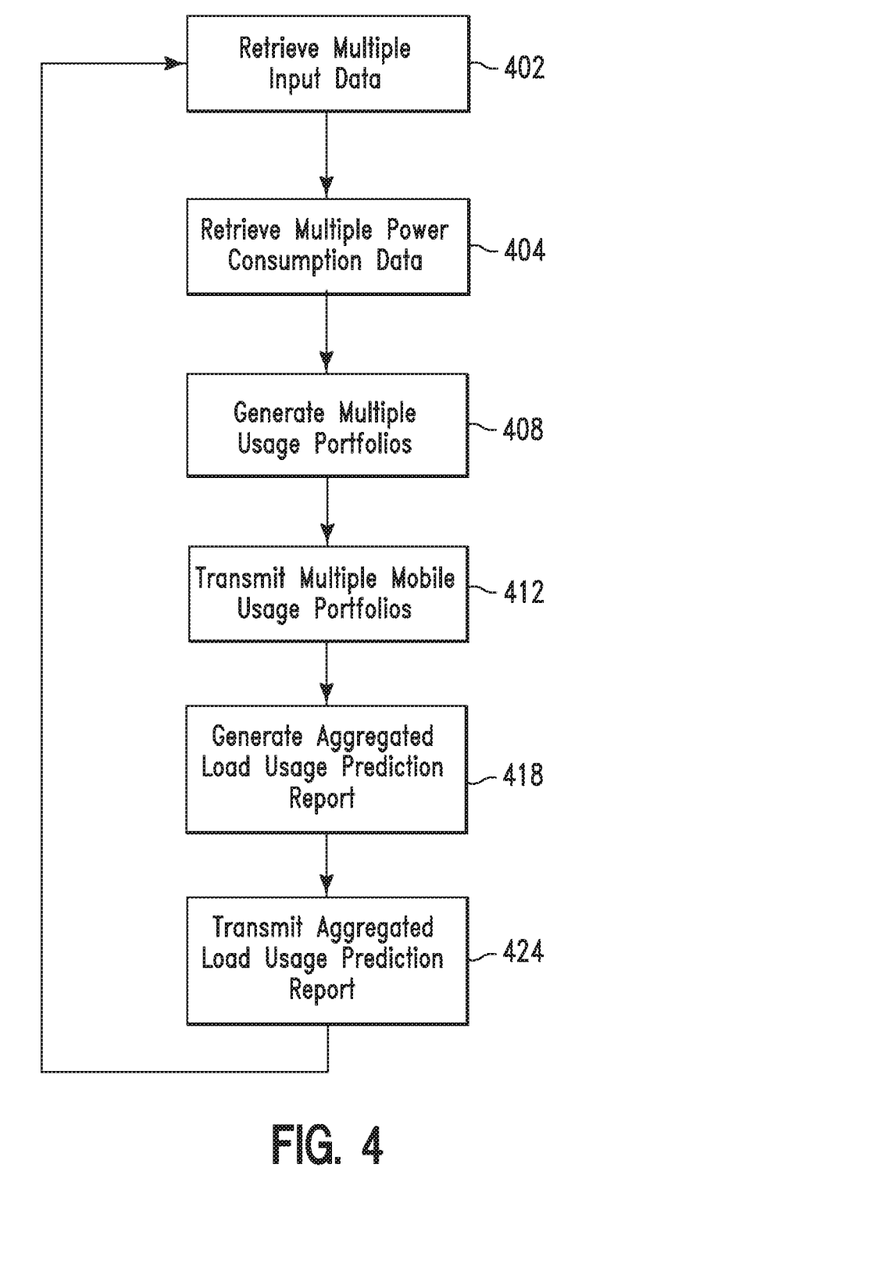
FIG. 4 illustrates a flowchart describing an algorithm used by the system FIG. 2 for predicting an amount of power usage associated with a power transmission grid, in accordance with embodiments of the present invention.

FIG. 4 illustrates a flowchart describing an algorithm used by system 2a of FIG. 1 for generating load usage prediction reports for multiple users, in accordance with embodiments of the present invention. In step 302, a computing system (e.g., a computer processor computing system 8c of FIG. 2 retrieves input data (from mobile computing systems) associated with:
1. A first user of first power consumption devices (e.g., power consumption devices 4a . . . 14n) at a first specified location (e.g., location 18a).
2. A second user of first power consumption devices (e.g., power consumption devices 14a . . . 14n) at a first specified location (e.g., location 18a) or second power consumption devices (e.g., power consumption devices 24a . . . 24n) at a second specified location (e.g., location 18n).

Figure 5:
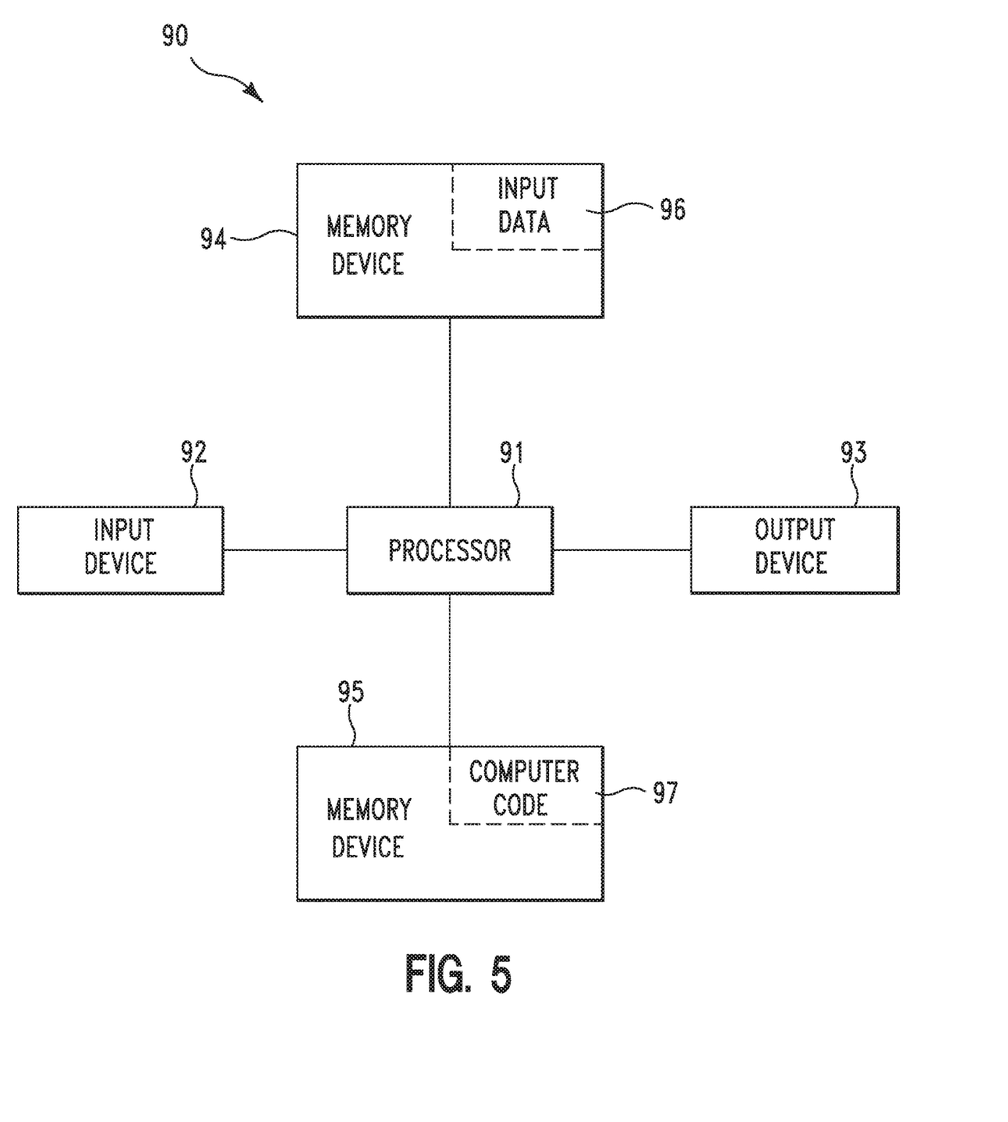
FIG. 5 illustrates a computer apparatus used for predicting an amount of power usage associated with a power transmission grid, in accordance with embodiments of the present invention.

In step 404, the computing system retrieves power consumption data comprising a power consumption level for each of the power consumption devices. In step 308, the computing system retrieves power consumption data comprising a power consumption level for each of the first and/or second power consumption devices. In step 408, the computing system generates (i.e., based on the input data), mobile usage portfolios associated the first and second users and the first and/or second power consumption devices. In step 412, the computing system transmits (to the specified locations) the associated mobile usage portfolios. In step 418, the computing system generates (i.e., based on the mobile usage portfolios and the power consumption data) an aggregated load usage prediction report associated with the first and second users and the power consumption devices. The load usage prediction report may comprise, inter alia, a predicted amount of power usage for the power consumption devices during a future specified time period, an expected amount of variation from the predicted amount of power usage, a current location of the user, a distance between locations, etc. In step 424, the computing system transmits the aggregated load usage prediction report to a power provider utility for analysis and the process is repeated for the first and second users (add optionally additional users) at the same or different locations, generating a modified load usage prediction report using new data, etc. retrieves and stores identification data identifying a power consumption devices at a single location (e.g., locally at the single location) or multiple locations (e.g., at a regional FIG. 5 illustrates a computer apparatus 90 (e.g., computing system 8a, 8n, 8c, or 15n of FIGS. 1 and 2) used for predicting an amount of power usage associated with a power transmission grid, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-4) for predicting an amount of power usage associated with a power transmission grid. The processor 91 enables the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service supplier who offers to predict an amount of power usage associated with a power transmission grid. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for predicting an amount of power usage associated with a power transmission grid. In another embodiment, the invention provides a business method that performs the process steps of the invention on a subscription, advertising, and/or fee basis. That is, a service supplier, such as a Solution Integrator, could offer to predict an amount of power usage associated with a power transmission grid. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A power usage prediction and voltage modification method comprising:

retrieving, by a computer processor of a mobile computing system, first power consumption data comprising a power consumption level for each power consumption device of a first plurality of power consumption devices at a first specified location, wherein said mobile computing system comprises stored first input data associated with a first user of said first plurality of power consumption devices;

monitoring, by said computer processor, usage of plumbing fixtures at said first specified location;

determining, by said computer processor based on results of said monitoring, a plumbing usage deviation value indicating that at least one plumbing fixture of said plumbing fixtures has not been used for a specified time period;

monitoring, by said computer processor via a security system, motion detectors at said first specified location;

detecting, by said computer processor based on results of said monitoring said motion detectors, motion of individuals at said first specified location;

additionally detecting, by said processor, an arming status of said security system;

generating, by said computer processor based on a received first mobile usage portfolio associated said first user and said first plurality of power consumption devices, said plumbing usage deviation value, results of said detecting, results of said additionally detecting, and said first power consumption data, a first load usage prediction report associated with said first user and said first plurality of power consumption devices;

transmitting, by said computer processor to a power provider utility for analysis, said first load usage prediction report;

determining, by said processor, that a frequency signal associated with a supply voltage retrieved from a power grid is fluctuating; and disabling in response to said analysis of said first load usage prediction report and said determining that said frequency signal is fluctuating, by said computer processor controlling a relay of said mobile computing system, power to at least one power consumption device of said first plurality of power consumption devices thereby modifying a load on said power grid such that faster power grid response times are achieved.

2. The method of claim 1, further comprising:

transmitting, by said computer processor to said first specified location, said first load usage prediction report.

3. The method of claim 1, further comprising:

retrieving, by said computer processor, second input data associated with said first user, wherein said second input data is associated with a second plurality of power consumption devices used by said first user at a second specified location, wherein said second specified location differs from said first specified location;

retrieving, by said computer processor, second power consumption data comprising a power consumption level for each power consumption device of said second plurality of power consumption devices;

generating, by said computer processor based on said second input data and said first mobile usage portfolio, a second mobile usage portfolio associated said first user and said second plurality of power consumption devices;

transmitting, by said computer processor to said second specified location, said second mobile usage portfolio;

generating, by said computer processor based on said first mobile usage portfolio, said second mobile usage portfolio, and said second power consumption data, a second load usage prediction report associated with said first user, said first plurality of power consumption devices, and said second plurality of power consumption devices; and transmitting, by said computer processor to said power provider utility for analysis, said second load usage prediction report.

4. The method of claim 1, further comprising:

retrieving, by said computer processor, updated input data associated with said first user of said first plurality of power consumption devices at said first specified location;

generating, by said computer processor based on said updated input data and said first mobile usage portfolio, a modified mobile usage portfolio associated said first user and said first plurality of power consumption devices;

transmitting, by said computer processor to said first specified location, said modified mobile usage portfolio;

generating, by said computer processor based on said modified mobile usage portfolio, a modified load usage prediction report associated with said first user and said first plurality of power consumption devices; and transmitting, by said computer processor to said power provider utility for analysis, said modified load usage prediction report.

5. The method of claim 1, wherein said generating said first load usage prediction report comprises:

calculating, by said computer processor, a predicted amount of power usage for said first plurality of power consumption devices during a future specified time period; and calculating, by said computer processor, an expected amount of variation from said predicted amount of power usage.

6. The method of claim 1, wherein said first mobile usage portfolio comprises behavioral data associated with said first user and said first plurality of power consumption devices.

7. The method of claim 1, wherein said generating said first mobile usage portfolio comprises:

retrieving, by said computer processor, a process schedule associated with processes performed by said first plurality of power consumption devices; and generating associations between said first user, said first plurality of power consumption devices, and said process schedule.

8. The method of claim 1, wherein said first input data comprises digital calendar data indicating a future schedule of said first user with respect to said first specified location.

9. The method of claim 1, further comprising:

detecting, by said computer processor, said current location of said first user;

determining, by said computer processor, a distance between said current location and said first specified location;

generating, by said computer processor, updated input data associated with said first user and said distance between said current location and said first specified location;

generating, by said computer processor based on said updated input data and said first mobile usage portfolio, a modified mobile usage portfolio associated said first user and said first plurality of power consumption devices;

transmitting, by said computer processor to said first specified location, said modified mobile usage portfolio;

generating, by said computer processor based on said modified mobile usage portfolio, a modified load usage prediction report associated with said first user and said first plurality of power consumption devices; and transmitting, by said computer processor to said power provider utility for analysis, said modified load usage prediction report.

10. The method of claim 9, wherein said detecting comprises communicating with a satellite to determine said current location.

11. The method of claim 1, further comprising:

receiving, by said computer processor, data indicating an expected number of individuals expected at said first specified location, wherein said generating said first load usage prediction report is further based on said data.

12. The method of claim 1, further comprising:

monitoring, by said computer processor, financial transaction data associated with financial transactions of said first user; and determining, by said computer processor based on results of said monitoring said financial transactions, a distance between said current location and said first specified location, wherein said generating said first load usage prediction report is further based on said distance.

13. A computer program product, comprising a computer hardware storage device storing a computer readable program code, said computer readable program code configured to perform the method of claim 1 upon being executed by said computer processor of said computing system.

14. The method of claim 1, further comprising:

providing at least one support service for at least one of creating, integrating, hosting, maintaining, and deploying computer-readable code, stored on a computer hardware storage device, in said computer processor, said code being executed by the computer processor to implement said retrieving said first input data, said retrieving said first power consumption data, said transmitting said first mobile usage portfolio, said monitoring, said determining, said generating, and said transmitting said first load usage prediction report.

15. A computing system comprising said processor coupled to a computer-readable memory unit, said memory unit comprising a computer readable code configured to be executed by the processor to perform the method of claim 1.

16. A power usage prediction and voltage modification method comprising:

retrieving, by a computer processor of computing system, first power consumption data comprising a power consumption level for each power consumption device of a first plurality of power consumption devices at a first specified location, wherein a first mobile computing system comprises stored first input data associated with a first user of said first plurality of power consumption devices, and wherein a second mobile computing system comprises second stored input data associated with a second user of said first plurality of power consumption devices at said first specified location;

transmitting, by said computer processor to said first specified location and said first mobile computing system, a first mobile usage portfolio associated said first user and said first plurality of power consumption devices;

monitoring, by said computer processor, usage of plumbing fixtures at said first specified location;

determining, by said computer processor based on results of said monitoring, a plumbing usage deviation value indicating that at least one plumbing fixture of said plumbing fixtures has not been used for a specified time period;

monitoring, by said computer processor via a security system, motion detectors at said first specified location;

detecting, by said computer processor based on results of said monitoring said motion detectors, motion of individuals at said first specified location, wherein said generating said first load usage prediction report is further based on results of said detecting;

additionally detecting, by said processor, an arming status of said security system;

generating, by said computer processor based on said second input data, a second mobile usage portfolio associated said second user and said first plurality of power consumption devices;

transmitting, by said computer processor to said first specified location and said second mobile computing system, said second mobile usage portfolio;

generating, by said computer processor based on said first mobile usage portfolio, said second mobile usage portfolio, said plumbing usage deviation value, results of said detecting, results of said additionally detecting, and said first power consumption data, a first load usage prediction report associated with said first user, said second user, and said first plurality of power consumption devices;

transmitting, by said computer processor to a power provider utility for analysis, said first load usage prediction report;

determining, by said processor, that a frequency signal associated with a supply voltage retrieved from a power grid is fluctuating; and disabling in response to said analysis of said first load usage prediction report and said determining that said frequency signal is fluctuating, by said computer processor controlling a relay of said mobile computing system, power to at least one power consumption device of said first plurality of power consumption devices thereby modifying a load on said power grid such that faster power grid response times are achieved.

17. The method of claim 16, further comprising:
detecting, by said computer processor, a first current location of said first user, wherein said first current location differs from said first specified location;

detecting, by said computer processor, a second current location of said second user, wherein said second current location differs from said first current location and said first specified location;

determining, by said computer processor, a first distance between said first current location and said first specified location;

determining, by said computer processor, a second distance between said second current location and said first specified location, wherein said first distance differs from said second distance;

generating, by said computer processor, first updated input data associated with said first user and said first distance between said first current location and said first specified location;

generating, by said computer processor, second updated input data associated with said second user and said second distance between said second current location and said first specified location;

generating, by said computer processor based on said first updated input data and said first mobile usage portfolio, a first modified mobile usage portfolio associated said first user and said first plurality of power consumption devices;

transmitting, by said computer processor to said first specified location and said first mobile computing system, said first modified mobile usage portfolio;

generating, by said computer processor based on said second updated input data and said second mobile usage portfolio, a second modified mobile usage portfolio associated said second user and said first plurality of power consumption devices;

transmitting, by said computer processor to said first specified location and said second mobile computing system, said second modified mobile usage portfolio;

generating, by said computer processor based on said first updated mobile usage portfolio, said second updated mobile usage portfolio, and said first power consumption data, a modified load usage prediction report associated with said first user, said second user, and said first plurality of power consumption devices; and transmitting, by said computer processor to said power provider utility for analysis, said modified load usage prediction report.

18. A power usage and voltage modification prediction method comprising:
retrieving, by a computer processor of computing system, first power consumption data comprising a power consumption level for each power consumption device of a first plurality of power consumption devices at a first specified location, wherein a first mobile computing system comprises stored first input data associated with a first user of said first plurality of power consumption devices at said first specified location, and wherein a second mobile computing system comprises second stored input data associated with a second user of a second plurality of power consumption devices at a second specified location, wherein said second specified location differs from said first specified location;

retrieving, by said computer processor from said first location, first power consumption data comprising a power consumption level for each power consumption device of said first plurality of power consumption devices;

retrieving, by said computer processor from said second location, second power consumption data comprising a power consumption level for each power consumption device of said second plurality of power consumption devices;

transmitting, by said computer processor to said first specified location and said first mobile computing system, a first mobile usage portfolio associated said first user and said first plurality of power consumption devices;

monitoring, by said computer processor, usage of plumbing fixtures at said first specified location;

determining, by said computer processor based on results of said monitoring, a plumbing usage deviation value indicating that at least one plumbing fixture of said plumbing fixtures has not been used for a specified time period;
monitoring, by said computer processor via a security system, motion detectors at said first specified location;
detecting, by said computer processor based on results of said monitoring said motion detectors, motion of individuals at said first specified location;
additionally detecting, by said processor, an arming status of said security system;
generating, by said computer processor based on said second input data, a second mobile usage portfolio associated said second user and said second plurality of power consumption devices;
transmitting, by said computer processor to said second specified location and said second mobile computing system, said second mobile usage portfolio;
generating, by said computer processor based on said first mobile usage portfolio, said second mobile usage portfolio, said first power consumption data, said plumbing usage deviation value, results of said detecting, results of said additionally detecting, and said second power consumption data, a first load usage prediction report associated with said first user, said second user, said first plurality of power consumption devices, and said second plurality of power consumption devices;
transmitting, by said computer processor to a power provider utility for analysis, said first load usage prediction report;
determining, by said processor, that a frequency signal associated with a supply voltage retrieved from a power grid is fluctuating; and
disabling in response to said analysis of said first load usage prediction report and said determining that said frequency signal is fluctuating, by said computer processor controlling a relay of said mobile computing system, power to at least one power consumption device of said first plurality of power consumption devices thereby modifying a load on said power grid such that faster power grid response times are achieved.

19. The method of claim 18, further comprising:
detecting, by said computer processor, a first current location of said first user, wherein said first current location differs from said first specified location;
detecting, by said computer processor, a second current location of said second user, wherein said second current location differs from said first current location, said first specified location, and said second specified location;
determining, by said computer processor, a first distance between said first current location and said first specified location;
determining, by said computer processor, a second distance between said second current location and said second specified location, wherein said first distance differs from said second distance;
generating, by said computer processor, first updated input data associated with said first user and said first distance between said first current location and said first specified location;
generating, by said computer processor, second updated input data associated with said second user and said second distance between said second current location and said second specified location;
generating, by said computer processor based on said first updated input data and said first mobile usage portfolio, a first modified mobile usage portfolio associated said first user and said first plurality of power consumption devices;
transmitting, by said computer processor to said first specified location and said first mobile computing system, said first updated mobile usage portfolio;
generating, by said computer processor based on said second updated input data and said second mobile usage portfolio, a second modified mobile usage portfolio associated said second user and said second plurality of power consumption devices;
transmitting, by said computer processor to said second specified location and said second mobile computing system, said second updated mobile usage portfolio;
generating, by said computer processor based on said first updated mobile usage portfolio, said second updated mobile usage portfolio, said first power consumption data, and said second power consumption data, a modified load usage prediction report associated with said first user, said second user, said first plurality of power consumption devices, and said second plurality of power consumption devices; and
transmitting, by said computer processor to said power provider utility for analysis, said modified load usage prediction report.

* * * * *